May 7, 1935. R. LINCKE 2,000,768
METHOD OF MAKING CONTACT GLASSES FOR EYES
Filed June 29, 1934

Inventor:
Rudolf Lincke

Patented May 7, 1935

2,000,768

UNITED STATES PATENT OFFICE 2,000,768

METHOD OF MAKING CONTACT GLASSES FOR EYES

Rudolf Lincke, Jena, Germany, assignor to the firm Carl Zeiss, Jena, Germany

Application June 29, 1934, Serial No. 733,149
In Germany July 6, 1933

1 Claim. (Cl. 49—79)

I have filed an application in Germany, July 6, 1933.

Contact glasses for eyes are generally manufactured by means of a blowing process. The closed end of a glass tube is inflated and the resulting bulb is blown in a mould hollowed out to the shape the contact glass is to assume. Subsequently thereto, the shell representing the contact glass is separated from the bulb. Contact glasses thus produced are to be worked only at the edges of separation from the said bulb, and the remaining part of the surface, especially the corneal part, is ready manufactured in the blowing process. The contact glass surfaces obtained by blowing are said to irritate the wearer's eyes much less than surfaces that had to be ground and polished. This method is, however, not very advantageous in that the interior surface of the contact glass may not be given the accurate shape as regards superficial curvature, which is of importance especially when the central corneal part of the glass is to produce an additional correction of the eye.

The invention, which concerns a method of making contact glasses that touch the eye only with blown contact surfaces, and which aims at avoiding the said disadvantage, is based on the idea that there is no need of working the blown interior surface of the contact glass when this interior surface, which is the only surface touching the eye, is so blown as to assume the correct shape at once, a subsequent treatment being required only by the exterior surface, which is to be given the predetermined curvature for the desired correction of sight. The method consists in blowing a glass bulb and in so pressing the bulb during the blowing process against a convex form that part of the bulb finally assumes the shape of this form, by then separating the said part of the bulb from the blown body, and by so grinding and polishing the exterior surface of this separated part that its centre has the effect of a lens and that its circumference has a smooth edge. For blowing may be used a glass-maker's pipe of corresponding size or a glass tube which provides itself the material for blowing the contact glass.

The form giving the contact glass its predetermined interior surface is a convex body whose exterior surface corresponds exactly to the entire interior surface of the desired contact glass.

Figure 1:
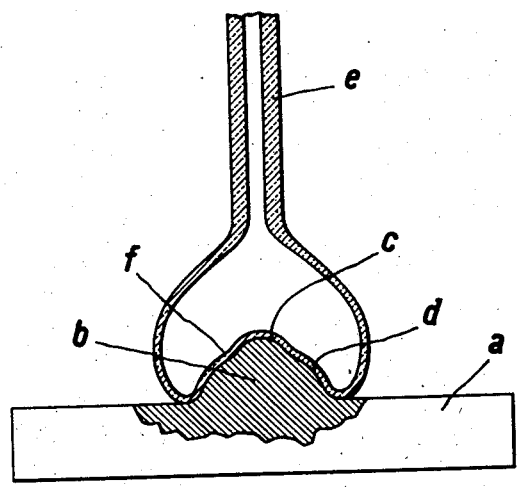
Figure 2:

In the accompanying drawing, which represents a constructional example of the invention, Figure 1 shows a section through the form and the blown hollow glass body and Figure 2 illustrates a section through the obtained half-finished product, which is not yet ground and polished.

The blowing form consists of a plate $a$ having a convex part $b$ whose surface is so shaped according to the interior surface of the contact glass to be produced that it has a central corneal surface $c$ and a peripheral sclerotic part $d$. The blowing is effected by means of a glass tube $e$ whose wall supplies the material for the contact glass. Subsequently to one of its ends having been closed by melting, the glass tube $d$ is blown out into the shape of a bulb and so pressed and blown against the part $b$ of the form $a$ that the surface of this part $b$ is impressed into the bulb in such a manner as to produce a shell $f$ whose interior surface corresponds exactly to the interior surface of the desired contact glass. After having cooled down subsequently to the blowing process, the shell $f$, as represented by Figure 2, is cut away from the bulb and ground and polished according to the meridional curve represented by dash lines, the superfluous marginal parts $g$ being thus removed and the corneal part $h$ representing a lens that produces the desired correction of sight.

I claim:

A method of making contact glasses for eyes, consisting in blowing a bulb of plastic glass, then blowing this plastic bulb against a convex form, so as to give part of the bulb the shape of a shell and to make the final interior surface of this shell correspond to the interior surface of a contact glass, then allowing the blown bulb to become solid and separating the shell from the bulb, and finally so grinding and polishing the exterior surface of the separated shell as to give the central part of the shell the effect of a lens and to provide the peripheral part of the shell with a smooth edge.

RUDOLF LINCKE.